US009058359B2

(12) United States Patent
Butler et al.

(10) Patent No.: US 9,058,359 B2
(45) Date of Patent: Jun. 16, 2015

(54) PROACTIVE RISK ANALYSIS AND GOVERNANCE OF UPGRADE PROCESS

(71) Applicant: International Business Machines Corporation, Armonk, NY (US)

(72) Inventors: Eric K. Butler, San Jose, CA (US); Thomas D. Griffin, Campbell, CA (US); Patrick B. Heywood, Louisville, CO (US); Divyesh Jadav, San Jose, CA (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/672,770

(22) Filed: Nov. 9, 2012

(65) Prior Publication Data

US 2014/0136901 A1    May 15, 2014

(51) Int. Cl.
G06F 11/00 (2006.01)
G06F 11/30 (2006.01)
G06F 11/34 (2006.01)
G06F 11/14 (2006.01)

(52) U.S. Cl.
CPC ........ *G06F 11/3051* (2013.01); *G06F 11/3409* (2013.01); *G06F 11/3003* (2013.01); *G06F 11/008* (2013.01); *G06F 11/1415* (2013.01); *G06F 2201/81* (2013.01); *G06F 2201/865* (2013.01); *G06F 2201/88* (2013.01)

(58) Field of Classification Search
CPC .............................. G06F 11/00; G06F 11/3409
USPC ....................................................... 714/47.1
See application file for complete search history.

(56) References Cited

U.S. PATENT DOCUMENTS

| | | | |
|---|---|---|---|
| 6,430,481 B1 * | 8/2002 | Lovelace et al. | 701/19 |
| 7,016,809 B1 | 3/2006 | Gotwals et al. | |
| 8,135,821 B2 * | 3/2012 | Agrawal et al. | 709/224 |
| 8,201,257 B1 | 6/2012 | Andres et al. | |
| 8,392,902 B2 * | 3/2013 | Reinz | 717/168 |
| 8,640,092 B2 * | 1/2014 | Niimura et al. | 717/120 |
| 2003/0149548 A1 * | 8/2003 | Mosses et al. | 702/184 |
| 2006/0224544 A1 * | 10/2006 | Keith, Jr. | 706/60 |
| 2006/0248541 A1 * | 11/2006 | Kanevsky et al. | 719/321 |
| 2009/0204853 A1 * | 8/2009 | Diggs et al. | 714/47 |
| 2010/0027432 A1 | 2/2010 | Gopalan et al. | |
| 2010/0274789 A1 | 10/2010 | Grace et al. | |
| 2011/0166849 A1 | 7/2011 | Dube et al. | |
| 2011/0185353 A1 * | 7/2011 | Matthew | 717/178 |
| 2013/0081134 A1 * | 3/2013 | Glew et al. | 726/22 |

* cited by examiner

*Primary Examiner* — Amine Riad
(74) *Attorney, Agent, or Firm* — Patrick J. Daugherty; Driggs, Hogg, Daugherty & Del Zoppo Co., LPA

(57) ABSTRACT

An incompatible software level of an information technology infrastructure component is determined by comparing collected inventory information to a minimum recommended software level. If a knowledge base search finds that the incompatible software level is associated with a prior infrastructure outage event, an outage count score is determined for the incompatible software level by applying an outage rule to a historic count of outages caused by a similar incompatible software level, and combined with an average outage severity score assigned to the incompatible software level based on a level of severity of an actual historic failure of the component within a context of the infrastructure to generate a normalized historical affinity risk score. The normalized historical affinity risk score is provided for prioritizing the correction of the incompatible software level in the context of other normalized historical risk level scores of other determined incompatible software levels.

20 Claims, 4 Drawing Sheets

Table 1

| Resource Type | Machine Type | Model Number | Serial Number | Firmware Level |
|---|---|---|---|---|
| Storage Subsystem | 2107 | 922 | 751C284 | 4.3.22.1 |

Table 2

| Outage Count | Outage Score |
|---|---|
| 0 - 4 | 0.33 |
| 5 - 19 | 0.67 |
| 20+ | 1.0 |

Table 3

| Rule # | Rule Description | Outage Count | Average Outage Severity | Score |
|---|---|---|---|---|
| 3 | F/W Level < Min Recommended Level | 25 | 0.33 | 0.67 |
| 11 | Resource is Support-end-of-life | 4 | 1.0 | 1.0 |

TOTAL SCORE: 1.67

**HISTORICAL AFFINITY RISK LEVEL = 1.67 * 10/2 = 8.35**

FIG 3

Table 4

| # | Parameter Name | Threshold 1 | Threshold 2 | Threshold 3 | Observed value | Score |
|---|---|---|---|---|---|---|
| 1 | Capacity Utilization | < 25% | >= 25% and < 50% | >= 50% | 40% | 0.67 |
| 2 | Storage Capacity | < 10 TB | >= 10 TB and < 500 TB | >= 500 TB | 900 TB | 1.00 |
| 3 | Average IO Rate (IOPS) | < 200 IOPS | >= 200 IOPS, < 1000 IOPS | >= 1000 IOPS | 150 IOPS | 0.33 |
| 4 | Age | < 1 year | >= 1 year and < 3 years | >= 3 years | 5 years | 1.00 |
| 5 | Connectivity | < 5 devices | >= 5 and < 20 devices | >= 20 devices | 10 | 0.67 |
| 6 | Availability SLA Stringency | < 90% | >= 90% and < 95% | >= 95% | 99% | 1.00 |
| 7 | Application Type | Offline / stand-alone | Periodic / batch | Transactional / mission critical | Backup (periodic) | 0.67 |

TOTAL SCORE: 5.33

NORMALIZED ENVIRONMENT RISK LEVEL = 5.33 * 10/7 = 7.61

FIG 4

PROACTIVE RISK ANALYSIS AND GOVERNANCE OF UPGRADE PROCESS

FIELD OF THE INVENTION

Embodiments of the present invention relate to proactively determining exposure risks with respect to failure in the operation of computerized systems, and taking preventative measures prior to an occurrence of the determined failure.

BACKGROUND

Growth of data produced by enterprises and individual consumers, along with ever-increasing types of interaction, transformation and retention of such data due to new social media platforms, end user devices, analytics applications, and regulatory mandates, etc., results in corresponding increases in the complexity of Information Technology (IT) infrastructure used to store such data, and the applications that serve, produce, transform and/or consume such data.

The increasing complexity of IT infrastructure has also been accompanied by an increase in the quantity of devices and resources that comprise the infrastructure. For example, a web site may have a front end load balancing layer of web servers including tens or hundreds of computers, connected together by tens of Ethernet switches. Each of the servers may run web server and other software, including monitoring software, intrusion detection software, etc. Each computer may have multiple Fibre Channel Host Bus Adapters (HBAs), each of which can be connected to one or more edge switches in a Storage Area Network (SAN) Fabric. Edge switches connect to multiple core switches, which then connect (possibly through other edge switches) to one or more storage subsystems. Each storage subsystem can have multiple HBAs, servers, memory caches, internal interconnects, non-volatile memory banks, RAID (redundant array of independent disk) engines, device adaptors and, finally, an assortment of solid state and magnetic disks. Accordingly, the task of managing such numerous and heterogeneous resources is generally highly labor-intensive and requires specialized skills and tools.

One cause of application or service unavailability is infrastructure downtime due to incompatible firmware. Avoiding problems in this area generally requires monitoring implemented system components to detect incompatible software, firmware or hardware versions, and implementing a governance process for resolving said problems by bringing software or hardware or firmware up to date. Efficiently or effectively carrying out such tasks in large systems is challenging, and outages may be difficult or impossible to prevent in prior art systems and methods.

BRIEF SUMMARY

In one embodiment of the present invention, a method for management of information technology component software levels includes collecting inventory information relevant to components in an information technology infrastructure from data relevant to the information technology infrastructure. An incompatible software level of one of the components is determined by comparing the collected inventory information to a minimum recommended software level for the component, wherein the incompatible software level is a stale current version of software that does not meet a minimum version requirement for the component, or fails to meet a minimum level required to ensure interoperability of the component with another of the infrastructure components. A knowledge base is searched for an association of the incompatible software level to a prior infrastructure outage event. If the search finds that the incompatible software level is associated with a prior infrastructure outage event, then an outage count score is determined for the incompatible software level by applying an outage rule to a historic count of outages caused by a similar incompatible software level found in a history of the knowledge base, and combining the outage count score with an average outage severity score assigned to the incompatible software level based on a level of severity of an actual historic failure of the component within a context of the infrastructure to generate a normalized historical affinity risk score for the at least one rule. The normalized historical affinity risk score is associated with continuing to operate the component at the incompatible software level, based on a comparison with past outages caused by a similar incompatible software level for that component type, and is provided for use in prioritizing the correction of the incompatible software level in the context of other normalized historical risk level scores of other incompatible software levels determined within the information technology infrastructure.

In another embodiment, a method provides a service for management of information technology component software levels. The method includes integrating computer-readable program code into a computer system comprising a processing unit, a computer readable memory and a computer readable tangible storage medium. Computer readable program code is embodied on the computer readable tangible storage medium and comprises instructions that, when executed by the processing unit via the computer readable memory, cause the processing unit to collect inventory information relevant to components in an information technology infrastructure from data relevant to the information technology infrastructure. An incompatible software level of one of the components is determined by comparing the collected inventory information to a minimum recommended software level for the component, wherein the incompatible software level is a stale current version of software that does not meet a minimum version requirement for the component, or fails to meet a minimum level required to ensure interoperability of the component with another of the infrastructure components. A knowledge base is searched for an association of the incompatible software level to a prior infrastructure outage event. If the search finds that the incompatible software level is associated with a prior infrastructure outage event, then an outage count score is determined for the incompatible software level by applying an outage rule to a historic count of outages caused by a similar incompatible software level found in a history of the knowledge base, and combining the outage count score with an average outage severity score assigned to the incompatible software level based on a level of severity of an actual historic failure of the component within a context of the infrastructure to generate a normalized historical affinity risk score for the at least one rule. The normalized historical affinity risk score is associated with continuing to operate the component at the incompatible software level, based on a comparison with past outages caused by a similar incompatible software level for that component type, and is provided for use in prioritizing the correction of the incompatible software level in the context of other normalized historical risk level scores of other incompatible software levels determined within the information technology infrastructure.

In another embodiment, a system has a processing unit, computer readable memory and a tangible computer-readable storage medium with program instructions, wherein the processing unit, when executing the stored program instructions, collects inventory information relevant to components in an information technology infrastructure from data relevant to the information technology infrastructure. An incompatible software level of one of the components is determined by comparing the collected inventory information to a minimum recommended software level for the component, wherein the incompatible software level is a stale current version of software that does not meet a minimum version requirement for the component, or fails to meet a minimum level required to ensure interoperability of the component with another of the infrastructure components. A knowledge base is searched for an association of the incompatible software level to a prior infrastructure outage event. If the search finds that the incompatible software level is associated with a prior infrastructure outage event, then an outage count score is determined for the incompatible software level by applying an outage rule to a historic count of outages caused by a similar incompatible software level found in a history of the knowledge base, and combining the outage count score with an average outage severity score assigned to the incompatible software level based on a level of severity of an actual historic failure of the component within a context of the infrastructure to generate a normalized historical affinity risk score for the at least one rule. The normalized historical affinity risk score is associated with continuing to operate the component at the incompatible software level, based on a comparison with past outages caused by a similar incompatible software level for that component type, and is provided for use in prioritizing the correction of the incompatible software level in the context of other normalized historical risk level scores of other incompatible software levels determined within the information technology infrastructure.

In another embodiment, a computer program product has a tangible computer-readable storage medium with computer readable program code embodied therewith, the computer readable program code comprising instructions that, when executed by a computer processing unit, cause the computer processing unit to collect inventory information relevant to components in an information technology infrastructure from data relevant to the information technology infrastructure. An incompatible software level of one of the components is determined by comparing the collected inventory information to a minimum recommended software level for the component, wherein the incompatible software level is a stale current version of software that does not meet a minimum version requirement for the component, or is an incompatible software level that fails to meet a minimum level required to ensure interoperability of the component with another of the infrastructure components. A knowledge base is searched for an association of the incompatible software level to a prior infrastructure outage event. If the search finds that the incompatible software level is associated with a prior infrastructure outage event, then an outage count score is determined for the incompatible software level by applying an outage rule to a historic count of outages caused by a similar incompatible software level found in a history of the knowledge base, and combining the outage count score with an average outage severity score assigned to the incompatible software level based on a level of severity of an actual historic failure of the component within a context of the infrastructure to generate a normalized historical affinity risk score for the at least one rule. The normalized historical affinity risk score is associated with continuing to operate the component at the incompatible software level, based on a comparison with past outages caused by a similar incompatible software level for that component type, and is provided for use in prioritizing the correction of the incompatible software level in the context of other normalized historical risk level scores of other incompatible software levels determined within the information technology infrastructure.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIG. 3 provides tabular illustrations of information technology inventory data stored in a configuration repository, assignable outage scores and risk level scores according to the present invention.

FIG. 4 provides tabular illustrations of risk level scores determined from information technology inventory data according to the present invention.

Figure 1:
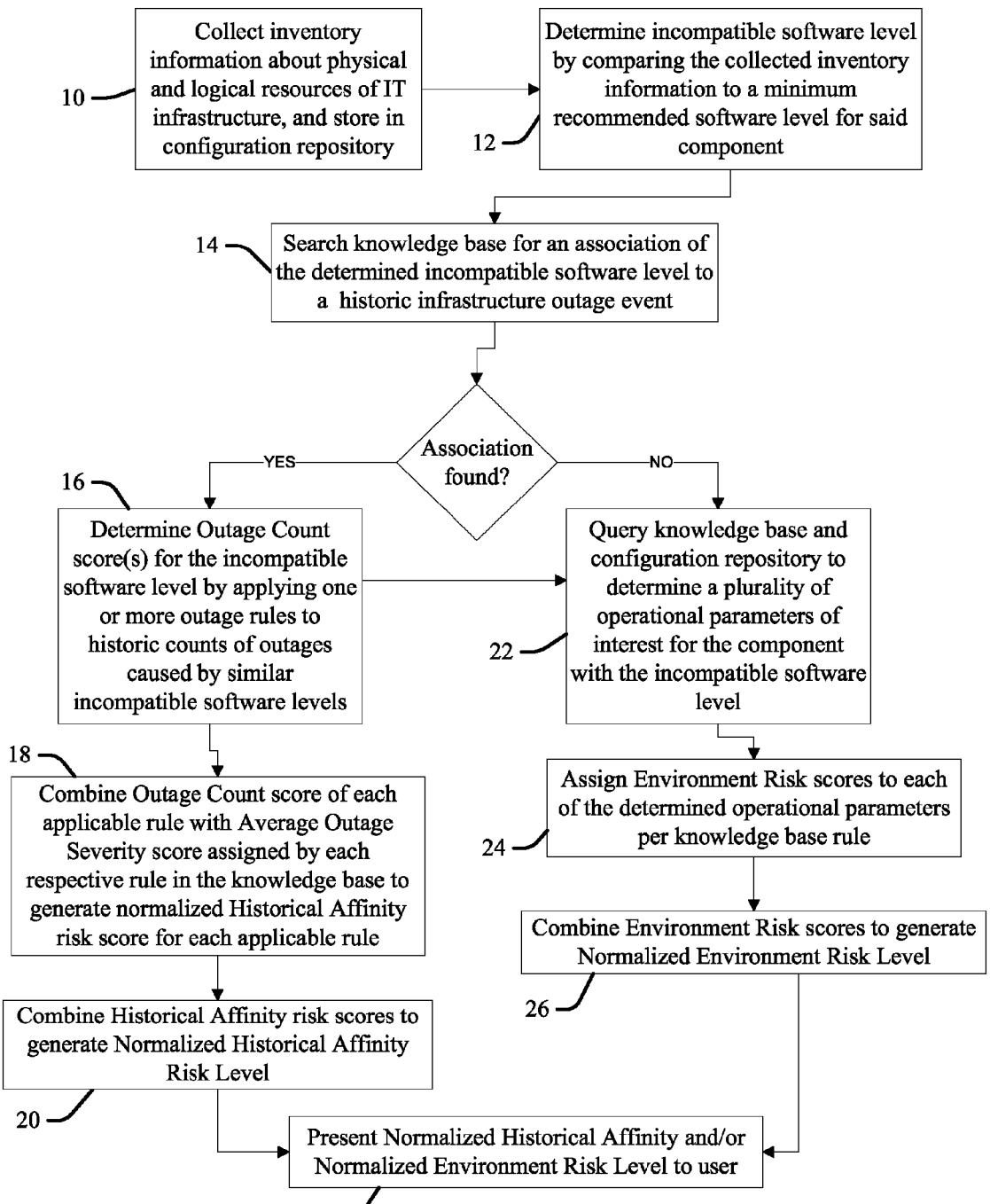
FIG. 1 is a block diagram illustration of a method or process for management of information technology component software levels according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments of the present invention include IT infrastructure management tools that aid in managing complex systems by targeting operational tasks such as provisioning storage and virtual machines, monitoring SANs, and recording and reporting performance of managed resources. Discovery and scanning modules may query managed resources on a periodic basis. A database may comprise tables that express the identity and properties of managed entities, and an outage tracking system may manage the end-to-end outage life cycle through ticketing, analysis, resolution, etc. Databases may store information about both physical objects whose presence is directly observable or reportable (for example, computer, storage subsystems, switches), and also logical objects that could be embedded in the physical objects (for example, logical volumes, access controls, firmware, replication relationships). Thus, discovery and scanning modules may query a managed infrastructure, and populate and update the results in database tables, wherein a management facility can read the tables, run algorithms to process entity relationships, and store the result back in the database. Further, trusted applications can read the contents of the database.

Secondary artifacts useful in the management of such systems include advisories or rules-of-thumb of about good, suspect, incompatible, or recommended component software, hardware or firmware versions. Such advisories can come from websites and forums maintained by IT vendors, or from in-house knowledge from IT staff, or from public domain spreadsheets, Wilds, etc. Interoperability test results or rules may also be published by interoperability labs run by industry associations or vendors.

One cause of application or service unavailability is infrastructure downtime due to incompatible firmware. When two resources are connected or communicate with one another in a given system infrastructure, they must generally run application software, or embedded software that runs inside the devices (also known as firmware), that is compatible in terms of their respective version numbers. For example, using a back-level HBA in a state-of-the-art server can result in loss of connectivity to a SAN fabric. When any resource runs software that is either antiquated, or known to be incompatible, it is generally necessary to identify and isolate said resource, report it to the systems administrator(s), and govern the process of bringing the software up to date, usually by a software upgrade process.

Accordingly, aggressively monitoring software, and detecting incompatible software versions, is very useful in systems management. Quantifying the risk associated with incompatible or stale software in an environment, and the governance process for bringing that software up to date, are also generally useful in prioritizing management efforts. Further, the ability to apply lessons learnt from one outage to a multitude of customer accounts being managed by a service provider in a proactive manner may be useful in minimizing system downtimes. Embodiments of the present invention may leverage all three of these functions into one holistic process.

FIG. 1 illustrates a method or process for management of information technology component software levels according to the present invention. At 10 inventory information about a plurality of components in an IT infrastructure is collected from data relevant to the IT infrastructure. This may comprise periodically scanning each managed environment component for information such as firmware levels of resources, connectivity of resources, age of resources, etc. Software and firmware levels of individual devices may be stored at 10, as well as components of individual devices, and connectivity information about devices in each managed infrastructure. Some embodiments additionally store the source of a set of inventory information (whether a tool, spreadsheet or custom sensors), and time stamp data signifying when the set of inventory information was collected.

Information may be collected at 10 from a plurality of sources including systems resource management tools, databases that store heartbeat information from devices deployed in the field, manually maintained tracking mechanisms such as spreadsheets, custom agents and sensors deployed on resources of interest, firmware upgrade advisories received via email and other notifications, and still other sources will be apparent to one skilled in the art. Information may be collected about managed resources whether the resources are locally or remotely situated, and the same information gathered and/or reported by different sources may be correlated and cleansed in collecting the inventory information at 10.

In some embodiments, storing the collected information comprises persistently storing the information in at least one tangible, non-volatile configuration repository memory medium, so that the data is not lost with loss of operative power to the respective repository. Resource information from different tenants (customers and accounts), and different tenant locations may be stored at 10 in a single database.

At 12 an incompatible software level of one of the components is determined by comparing the collected inventory information to a minimum recommended software level for said component. The incompatible software level may be "stale," wherein the current version or release of the software does not meet a minimum recommended, or most recently updated, version or release (hence, level) for the component. The incompatible software level may also fail to meet a minimum level required to ensure interoperability of that component with another of the infrastructure components.

At 14 a knowledge base is searched for an association of the incompatible software level to a prior or historic infrastructure outage event. More particularly, an outage history maintained in a knowledge base is queried to determine if the current, detected incompatible software level matches the level of a similar component that is associated with or known to cause one or more past outages in the prior history data of the same or similar infrastructure.

If said search at 14 finds that the incompatible software level is associated with a prior infrastructure outage event, then at 16 at least one "Outage Count" (OC) score is determined for the incompatible software level by applying one or more outage rules to historic counts of outages caused by similar incompatible software levels found in the past or prior history. At 18 the OC score of each applicable rule is combined with an "Average Outage Severity" (AOS) score assigned by each respective rule to the incompatible software level, based on a level of severity of an actual failure of the component within the context of the infrastructure, to thereby generate a normalized Historical Affinity risk score for each rule associated with continuing to operate the component at the incompatible software level. At 20 the normalized Historical Affinity risk scores for the applicable rules are combined and normalized to generate a total Normalized Historical Affinity Risk Level score for the incompatible software.

If the search of the knowledge base at 14 does not find that the incompatible software level is associated with a prior infrastructure outage event, or in parallel with the Normalized Historical Affinity Risk Level determination processes at 16-18-20, at 22 the configuration repository is queried to determine a plurality of operational parameters of interest for the component with the incompatible software level. At 24 Environment Risk (ER) scores are assigned to each of the determined operational parameters per rule, and the ER scores are combined and normalized at 26 to generate a Normalized Environment Risk Level score that is indicative of a risk to the infrastructure associated with continuing to operate the component at the incompatible software level.

At 28 the Normalized Historical and/or Normalized Environment Risk Level scores are presented to an automated governance device, system administrator, customer, user, etc., for automatic or manual use in prioritizing the correction of the incompatible software level in the context of any other determined ad software levels or other situations having their own relative risk level rankings and scores. Thus, a user may manually or automatically determine whether or not to take immediate (or later scheduled) steps to correct the incompatible software level, as a function of prioritizing multiple actions to be taken with respect to pluralities of system components relative to other determined and risk-scored incompatible software level components, etc.

Figure 2:
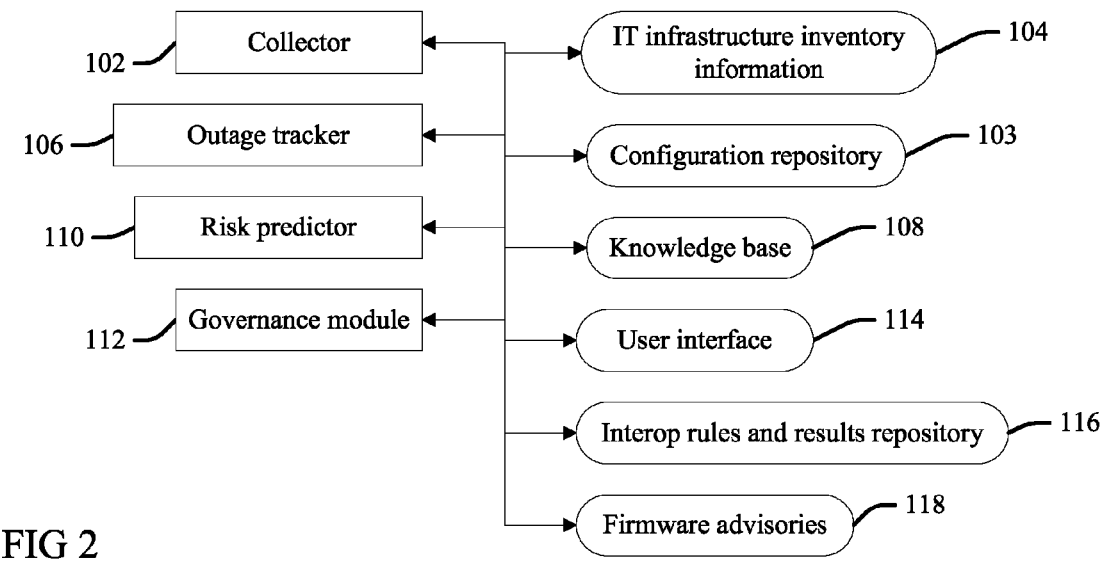
FIG. 2 illustrates an embodiment of a centralized system that manages software levels of information technology components according to the present invention.

FIG. 2 illustrates an embodiment of a centralized data processing system according to the present invention. A collector 102 retrieves or otherwise collects information 104 about a plurality of components (physical and/or logical resources) of an IT infrastructure (such as the information collected at 10 of FIG. 1 discussed above) and stores the collected information in a persistent (non-volatile) configuration repository 103. The configuration repository 103 is a tangible, non-volatile configuration repository memory medium that does not lose the stored data with loss of operative power to the respective repository.

An outage tracker 106 records the underlying cause of a service outage event in association with one or more incompatible software levels per one or more rules within a searchable knowledge base 108, which may be queried to determine if a detected incompatible software level matches a level of a similar component that is associated with or known to cause one or more past outages in the prior history data of the same or similar infrastructure, as discussed above with respect to 12 and 14 of FIG. 1. Embodiments of the outage tracker 106 present to an administrator an interactive presentation interface useful to the administrator in determining a cause of an outage resulting from a problem in a software (either application software or firmware) level. Mechanisms are also provided for the administrator to capture details about the outage caused by problematic software. For example, if an outage is reported in a customer's managed environment, an administrator may analyze the outage to manually determine a root cause of the underlying outage, though some embodiments may use automated determination processes and devices. If the outage is caused by one or more incompatible firmware levels, then the administrator via the outage tracker 106 identifies or defines a matching rule for the outage and stores the matching rule associated with the outage in the knowledge base 108. The knowledge base 108 allows the administrator to persistently store details about an outage, and embodiments include tangible, non-volatile configuration repository memory mediums wherein data is not lost with loss of operative power.

The prior event outages are also associated with rules by the outage tracker 106 that are stored in the knowledge base 108 for use in assessing the risk of continuing to operate the determined/detected incompatible software. Table 1 of FIG. 3 illustrates one example of IT inventory data 104 stored in the configuration repository 103 for an infrastructure "storage subsystem" component of the specified machine type, model number, and serial number and firmware level. Table 2 of FIG. 3 provides for three possible Outage Scores that may be assigned to each of the indicated respective ranges of outage counts associated with a given rule, wherein the highest risk score (1.0) is assigned for outage counts greater than or equal to 20, a mid-level score (0.67) assigned to counts between five and 19, and a lowest score (0.33) assigned to counts of four and less.

In this example, the Outage tracker 106 has captured a prior incident that was caused by firmware incompatibility of a similar resource due to the firmware level being below a minimum recommended level, and wherein this prior situation resulted in an outage count of 25 as shown in Rule #3 in Table 3. Accordingly, a similar incompatible software level in a similar or corresponding component within the IT infrastructure should be assigned the highest risk Outage Count score (1.0) by applying Table 2. Rule #3 also provides that the Average Outage Severity score on these outages is the lowest (0.33) of three possible scores, wherein the medium severity score is (0.67) and the highest score is (1.0).

In the present example, the Outage tracker 106 has also captured another prior incident associated with the same component and firmware level and created a second rule #11 shown in Table 3, wherein if the component is no longer being supported by a manufacturer or other service provider, then four outages may be anticipated, which provides for the lowest Outage Count score of (0.33) pursuant to Table 2. However, Rule #11 also reflects that these outages present the highest Average Outage Severity score of (1.0) when assessing the risks presented by a similar situation.

Outage details and associated remedy data may be flexibly persisted in the knowledge base 108 by the outage tracker 106 in a variety of formats. One illustrative but not limiting example is a causal format comprising data including: <resource type, resource identifier, observed firmware level, action attempted on failing resource, failed service identifier, severity of failed service, timestamp of service failure>.

The Risk predictor 110 detects incompatible software levels in the IT infrastructure as a function of the logical resources inventory information collected in the configuration repository 103 in view of the underlying service outage cause data stored in the knowledge base 108, and quantifies a risk of continuing to operate with the incompatible software levels (thus, it performs the processes or method steps at 16-18-20 and 22-24-26 of FIG. 1). The detection of stale or incompatible software levels may be accomplished by comparing the reported software level of a resource as stored in the configuration repository 103 with a minimum recommended level queried from a multitude of sources, including, but not limited to, the knowledge base 108, interoperability ("interop") rules and results in a repository 116 that are generated by testing of components of the managed system environment by test labs, firmware advisories 118 including risk reports and best practices published by vendors and in-house service personnel, and still other sources will be apparent to one skilled in the art. In identifying suspect software for a given resource, the risk predictor 110 may examine the connectivity of said resource with other resources as reflected by the data in the configuration repository 103, or by querying a managed system environment itself to determine whether the software installed on said resource is compatible with installed software on each of the other connected resources.

Table 3 of FIG. 3 provides one example of rule application by the risk predictor 110 and at steps 16-18-20 of FIG. 1 when the search at 14 finds that the incompatible software level is associated with a prior infrastructure outage. The Outage Count (OC) and Average Outage Severity (AOS) scores are combined to generate a total score shown in the rightmost column of Table 3 for each of rules found applicable (Rules #3 and #11) based on the following algorithm: If AOS=(1.0), then Score=(1.0); else, Score=(OC+AOS)/2. Thus, since the AOS of Rule #3 is not (1.0), then the Rule #3 Score=(OC+AOS)/2=(1.0+0.33)/2=0.67. However, since the AOS of Rule #11 is (1.0), then the Rule #11 Score=(1.0). As reflected at the bottom of Table 3, all of the rule scores are summed up and normalized to a Historical Affinity Risk Level between 1 and 10, wherein 10 represents the highest risk): in this example, by adding the Rule #3 Score (0.67) and the Rule #11 Score= (1.0) and dividing by two to generate an average score, then multiplying by ten to normalize on the ten-point scale.

Table 4 of FIG. 4 provides an example of rule application by the risk predictor 110 and at steps 22-24-26 of FIG. 1 for determining a normalized environmental risk level independent of correlation with a prior historical event, wherein a configuration repository 103 is queried to determine each of a plurality of operational parameters of interest for the component with the incompatible software level. Individual rows of Table 4 are populated with "Observed values" for each of an amount of available resource capacity utilization, an amount of storage capacity, an average Input-Output (I/O) rate, an age of the resource, resource connectivity attributes (for example, type, size or speed of data link), a stringency of availability provided by an application Service Level Agreement (SLA), and an application or component type. Environment Risk (ER) scores are assigned in the last column of each of the seven determined operational parameters per rule based on the respective three threshold values provided for each rule, wherein meeting "Threshold 1" results in assignment of the lowest score (0.33), meeting "Threshold 2" results in assignment of the mid-level score (0.67) and meeting "Threshold 3" results in assignment of the highest risk score (1.0). As reflected at the bottom of Table 4, all of the rule scores are summed up and normalized to a Normalized Environment Risk Level between 1 and 10, here by adding the scores and dividing by seven to generate an average score, then multiplying by ten to normalize on the ten-point scale.

The score calculations described above are illustrative but not exhaustive examples of embodiments of the present invention. It will be apparent to one skilled in the art that some embodiments may differentially weight certain risk level rankings and scores relative to others, and rule application and normalization processes may be flexible and modified as needed. In some embodiments, the score values and counts associated with given outages are differentially weighted or modified based on policy mandates or other new, observed incident data stored in the knowledge base 108 by the outage tracker 106 or the risk predictor 110.

A governance module 112 is provided to present the determined Historical Affinity and/or Normalized Environment Risk Level score to a user (system administrator, customer, user, etc.) for use in determining whether or not to takes steps to correct the incompatible software level (thus, at 28 of FIG. 1). The governance module 112 thereby enables a user to prioritize correction of the incompatible software level issue relative to other determined and risk-scored incompatible software level components, etc., and thereby to guide the process of restoring an incompatible software level to a known, good level as a function of the risk quantified by the risk predictor module 110.

The governance module 112 may also provide automatic, automated service prioritization, implementation and scheduling services, providing a workflow or communicating a procedure or task to a user via a user interface 114 for manually or automatically implementing to cure or restore an incompatible software level to a good level. Some embodiments display reports showing pluralities of resources with incompatible software levels as determined by the risk predictor 110, and allow modification of operational parameters of interest for a given resource type, and the threshold value to be assigned to each, which are persisted in the knowledge base 108.

Providing a workflow framework for restoring detected non-compliant software may comprise associating a timeframe for upgrading software for each resource that has non-compliant software, and starting a timer task against the timeframe. The governance module 112 may also provide an exception-handling and justification mechanism for delaying the software upgrade process by relevant actors, and an alerting mechanism (email, user interface, chat, telephone text messaging, etc.) for upgrades that have no overrides authorized or are not done within a determined time. The governance module 112 may track the progress of upgrade activities against a timer task, and provide a multi-level alerting mechanism with relative priorities determined by the urgency of upgrade tasks that are incomplete. A comment area may also be provided for communication and collaboration between the actors of upgrade tasks, and administrators that govern an upgrade process.

Thus, embodiments of the present invention provide a user with an objective scoring and ranking of the risk proposed to the infrastructure by the incompatible software, which may be used in an intelligent, holistic approach to manage pluralities of incompatible software levels that may exist at any given time in a given infrastructure. By capturing and persisting the causes of prior outages due to incompatible software in a knowledge base, proactive approaches may detect incompatible firmware and use algorithmic methods to analyze and quantify the risk associated with a given IT infrastructure due to the incompatible firmware, and provide a governance process to guide a software upgrade cycle when stale or incompatible software is detected.

In contrast, prior methods generally attempt to solve only a piece of a given problem area by solving individual problems as they are identified without taking into account the larger context of the needs or other components within a monitored infrastructure. In contrast, embodiments of the present invention provide a flexible framework that can ingest resource configuration and inventory from a variety of sources and take a holistic approach to the software information lifecycle management problem through prioritizing and focusing sometimes limited management resources first on those incompatible software issues that present the highest risk to the overall infrastructure. Further differentiation is achieved by the ability to adaptively learn from past outages caused by firmware issues, and use this knowledge to discretely update and quantify the risk associated with managing an environment that is known to have stale or incompatible software. Such capability may be combined with a governance process that may track the process of bringing a non-compliant set of resources to a compliant state, which may itself prioritize monitoring as a function of the relative determined risk scores and levels.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
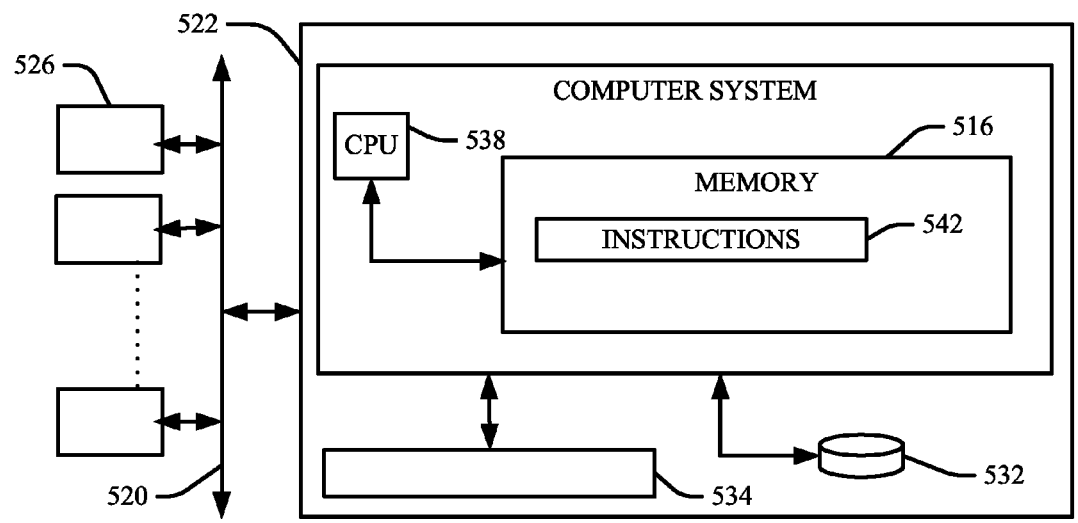
FIG. 5 is a block diagram illustration of a computer system implementation of an embodiment of the present invention.

Referring now to FIG. 5, an example of a computerized implementation of an embodiment of the present invention includes a computer system or other programmable device 522 in communication with a plurality of information technology infrastructure components 526 (servers, clients, programmable devices, applications, etc.) that manages software levels of said components 526 as described above with respect to FIGS. 1-4. Instructions 542 reside within computer readable code in a computer readable memory 516, or in a computer readable storage system 532, or other tangible computer readable storage medium 534 that is accessed through a computer network infrastructure 520 by a Central Processing Unit (CPU) 538. Thus, the instructions, when implemented by the processing unit 538, cause the processing unit 538 to manage software levels of the information technology infrastructure components 526 as described above with respect to FIGS. 1-4.

Embodiments of the present invention may also perform process steps of the invention on a subscription, advertising, and/or fee basis. That is, a service provider could offer to integrate computer-readable program code into the computer system 522 to enable the computer system 522 to manage software levels of the information technology infrastructure components 526 as described above with respect to FIGS. 1-4. The service provider can create, maintain, and support, etc., a computer infrastructure such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for management of information technology component software levels, the method comprising:
    determining an incompatible software level of one component of a plurality of components in an information technology infrastructure by comparing inventory information relevant to each of the components to a minimum recommended software level, wherein the incompatible software level is a stale current version of software that does not meet a minimum version requirement for the component, or fails to meet a minimum level required to ensure interoperability of the component with another of the infrastructure components;
    searching a knowledge base for an association of the determined incompatible software level to a prior infrastructure outage event;
    if the searching the knowledge base for the association of the determined incompatible software level to a prior infrastructure outage event finds that the determined incompatible software level is associated with a prior infrastructure outage event, determining an outage count score for the incompatible software level by applying at least one outage rule to a historic count of outages caused by a similar incompatible software level found in a history of the knowledge base, and combining the determined outage count score with an average outage severity score assigned to the determined incompatible software level based on a level of severity of an actual historic failure of the component within a context of the infrastructure to generate a normalized historical affinity risk score for the at least one rule, wherein the generated normalized historical affinity risk score is associated with continuing to operate the component at the determined incompatible software level, based on a comparison with past outages caused by a similar incompatible software level for that component type; and
    providing the normalized historical environment risk level score for use in prioritizing the correction of the determined incompatible software level in the context of other normalized historical risk level scores of other incompatible software levels determined within the information technology infrastructure.

2. The method of claim 1, further comprising:
    querying the collected inventory information to determine a plurality of operational parameters of interest for the component with the incompatible software level;
    assigning environment risk scores to each of the determined operational parameters per rule, and averaging and normalizing the assigned environment risk scores to generate a normalized environment risk level score that is indicative of a risk to the information technology infrastructure that is associated with continuing to operate the component at the determined incompatible software level; and
    providing the normalized environment risk level scores for use in prioritizing the correction of the determined incompatible software level in the context of other normalized environment risk level scores of other incompatible software levels determined within the information technology infrastructure.

3. The method of claim 2, further comprising:
    collecting the inventory information about the plurality of components in the information technology infrastructure from data relevant to the information technology infrastructure by periodically scanning each of a plurality of managed environment component resources for information comprising firmware levels, connectivity of resources, and ages of the component resources.

4. The method of claim 2, wherein the determined operational parameters comprise an amount of available resource capacity utilization, an amount of storage capacity, an average input-output rate, an age of the component, a data link connectivity attribute, a stringency of availability provided by an application service level agreement, and an application or component type.

5. The method of claim 2, wherein the steps of providing the normalized historical and the normalized environment risk level scores for use in prioritizing the correction of the determined incompatible software level comprises automatically ranking the determined normalized historical and the normalized environment risk level scores for the component relative to the risk levels determined for the other incompatible software levels determined within the information technology infrastructure.

6. The method of claim 2, wherein the step of searching the knowledge base for the association of the determined incompatible software level to the prior infrastructure outage event comprises querying an outage history maintained in the knowledge base to determine if the determined incompatible software level matches a level of a similar component that is associated with or known to cause an outage in prior history data of a historic infrastructure that is the same as or similar to the information technology infrastructure.

7. The method of claim 6, further comprising:
    determining a plurality of normalized historical affinity risk scores for each of a plurality of rules that are each associated with continuing to operate the component at the determined incompatible software level; and
    averaging the normalized historical affinity risk scores determined for each of the plurality of rules to generate the normalized historical affinity risk score.

8. The method of claim 7, wherein the outage count scores, the average outage severity scores and the environment risk scores are each selected from a group comprising a lowest risk value, and a highest risk value that is higher than the lowest risk value.

9. The method of claim 8, wherein the step of combining the outage count score with the average outage severity score to generate the normalized historical affinity risk score for the at least one rule comprises:
    in response to determining that the average outage severity score is not the highest risk value, adding the outage count score to the average outage severity score to generate an additive result, dividing the additive result by two to generate an averaged result, and normalizing the averaged result; and in response to determining that the average outage severity score is the highest risk value, normalizing the highest risk value.

10. The method of claim 9, wherein the outage count scores, the average outage severity scores and the environment risk scores are each selected from a group comprising the lowest risk value, the highest risk value, and a medium risk value that is higher than the lowest risk value and is lower than the highest risk value.

11. A method for providing a service for managing software levels of information technology components, the method comprising:

integrating computer-readable program code into a computer system comprising a processing unit, a computer readable memory and a non-transitory computer readable hardware storage device, wherein the computer readable program code is embodied on the computer readable hardware storage device and comprises instructions for execution by the processing unit via the computer readable memory that cause the processing unit to provide:

a collector that collects information comprising logical resources inventory information about a plurality of components of an information technology infrastructure, and stores the collected information in a non-volatile configuration repository storage medium;

an outage tracker that records outage data comprising an underlying cause of a service outage event, identifies a matching rule that associates the service outage event with an incompatible software level, and stores the matching rule associated with the recorded outage event in a searchable, non-volatile knowledge base storage medium; and a risk predictor that detects incompatible software levels in the information technology infrastructure components by comparing the logical resources inventory information collected and stored in the configuration repository to the service outage cause data stored in the knowledge base, and quantifies a risk of continuing to operate with the detected incompatible software level; and a governance module that prioritizes the quantified level of risk of continuing to operate with the detected incompatible software level relative to quantified risks of other incompatible software levels determined within the information technology infrastructure, and provides a workflow for restoring the incompatible software level to a good level as a function of the prioritized level of risk; and wherein the risk predictor, in response to determining that a search of the knowledge base for an association of the determined incompatible software level to a prior infrastructure outage event finds that the determined incompatible software level is associated with a prior infrastructure outage event, quantifies the risk of continuing to operate with the detected incompatible software level, based on a comparison with past outages caused by a similar incompatible software level for that component type, by:

determining an outage count score for the incompatible software level by applying at least one outage rule to a historic count of outages caused by a similar incompatible software level found in a history of the knowledge base; and combining the determined outage count score with an average outage severity score assigned to the determined incompatible software level by the outage tracker based on a level of severity of an actual historic failure of the component.

12. The method of claim 11, wherein the risk predictor further quantifies the risk of continuing to operate with the detected incompatible software level by:

querying the collected inventory information in the configuration repository to determine a plurality of operational parameters of interest for the component with the incompatible software level;

assigning environment risk scores to each of the determined operational parameters per rule; and averaging and normalizing the assigned environment risk scores to generate a normalized environment risk level score that is indicative of a risk to the information technology infrastructure that is associated with continuing to operate the component at the determined incompatible software level; and wherein the governance module prioritizes the correction of the determined incompatible software level relative to normalized environment risk level scores of other incompatible software levels determined within the information technology infrastructure, and provides the workflow for restoring the incompatible software level to a good level as a function of the prioritized normalized environment risk level scores.

13. The method of claim 12, wherein the risk predictor detects incompatible software levels in the information technology infrastructure components by comparing a reported software level of the component stored in the configuration repository with a minimum recommended level that is queried from a multitude of sources comprising a knowledge base, a risk report, firmware advisories and best practices published by an external vendor's or in-house service personnel, and an interoperability rule and result generated by testing of components of an environment of the information technology infrastructure by a test lab.

14. A system, comprising:
a processing unit;
a computer readable memory in communication with the processing unit; and
a non-transitory computer-readable hardware storage device in communication with the processing unit;
wherein the processing unit executes program instructions stored on the computer-readable hardware storage device via the computer readable memory and thereby:
determines an incompatible software level of one component of a plurality of components in an information technology infrastructure by comparing inventory information relevant to each of the components to a minimum recommended software level, wherein the incompatible software level is a stale current version of software that does not meet a minimum version requirement for the component, or is an incompatible software level that fails to meet a minimum level required to ensure interoperability of the component with another of the infrastructure components;
searches a knowledge base for an association of the determined incompatible software level to a prior infrastructure outage event;
in response to determining that the search of the knowledge base for the association of the determined incompatible software level to a prior infrastructure outage event finds that the determined incompatible software level is associated with a prior infrastructure outage event, determines an outage count score for the incompatible software level by applying at least one outage rule to a historic count of outages caused by a similar incompatible software level found in a history of the knowledge base, and combines the determined outage count score with an average outage severity score assigned to the determined incompatible software level based on a level of severity of an actual historic failure of the component within a context of the infrastructure to generate a normalized historical affinity risk score for the at least one rule, wherein the generated normalized historical affinity risk score is associated with continuing to operate the component at the determined incompatible software level, based on a comparison with past outages caused by a similar incompatible software level for that component type; and prioritizes the correction of the determined incompatible software level by comparing the normalized historical environment risk level score to other normalized historical risk level scores of other incompatible software levels determined within the information technology infrastructure.

15. The system of claim 14, wherein the processing unit executes the program instructions stored on the computer-readable hardware storage device via the computer readable memory and thereby further:

queries the collected inventory information to determine a plurality of operational parameters of interest for the component with the incompatible software level;

assigns environment risk scores to each of the determined operational parameters per rule, and averages and normalizes the assigned environment risk scores to generate a normalized environment risk level score that is indicative of a risk to the information technology infrastructure that is associated with continuing to operate the component at the determined incompatible software level; and prioritizes the correction of the determined incompatible software level by comparing the normalized environment risk level scores to other normalized environment risk level scores of other incompatible software levels determined within the information technology infrastructure.

16. The system of claim 15, wherein the processing unit executes the program instructions stored on the computer-readable hardware storage device via the computer readable memory and thereby further:

selects each of the outage count scores, the average outage severity scores and the environment risk scores from a group comprising a lowest risk value, and a highest risk value that is higher than the lowest risk value; and combines the outage count score with the average outage severity score to generate the normalized historical affinity risk by:

in response to determining that the average outage severity score is not the highest risk value, adding the outage count score to the average outage severity score to generate an additive result, dividing the additive result by two to generate an averaged result, and normalizing the averaged result; and in response to determining that the average outage severity score is the highest risk value, normalizing the highest risk value.

17. The system of claim 16, wherein the processing unit executes the program instructions stored on the computer-readable hardware storage device via the computer readable memory and thereby selects each of the outage count scores, the average outage severity scores and the environment risk scores from a group comprising the lowest risk value, the highest risk value, and a medium risk value that is higher than the lowest risk value and is lower than the highest risk value.

18. A computer program product for managing software levels of information technology components, said computer program product comprising:

a non-transitory computer readable hardware storage device having stored or encoded thereon, the computer readable program code comprising instructions for execution by a computer processing unit that cause the computer processing unit to:

collect inventory information relevant to each of a plurality of components in an information technology infrastructure from data relevant to the information technology infrastructure;

determine an incompatible software level of one of the components by comparing the collected inventory information to a minimum recommended software level for the component, wherein the incompatible software level is a stale current version of software that does not meet a minimum version requirement for the component, or is an incompatible software level that fails to meet a minimum level required to ensure interoperability of the component with another of the infrastructure components;

search a knowledge base for an association of the determined incompatible software level to a prior infrastructure outage event;

in response to determining that the search of the knowledge base for the association of the determined incompatible software level to a prior infrastructure outage event finds that the determined incompatible software level is associated with a prior infrastructure outage event, determine an outage count score for the incompatible software level by applying at least one outage rule to a historic count of outages caused by a similar incompatible software level found in a history of the knowledge base, and combining the determined outage count score with an average outage severity score assigned to the determined incompatible software level based on a level of severity of an actual historic failure of the component within a context of the infrastructure to generate a normalized historical affinity risk score for the at least one rule, wherein the generated normalized historical affinity risk score is associated with continuing to operate the component at the determined incompatible software level, based on a comparison with past outages caused by a similar incompatible software level for that component type; and prioritize the correction of the determined incompatible software level by comparing the normalized historical environment risk level score to other normalized historical risk level scores of other incompatible software levels determined within the information technology infrastructure.

19. The computer program product of claim 18, wherein the computer readable program code instructions for execution by the computer processing unit further cause the computer processing unit to:

query the collected inventory information to determine a plurality of operational parameters of interest for the component with the incompatible software level;

assign environment risk scores to each of the determined operational parameters per rule, and average and normalize the assigned environment risk scores to generate a normalized environment risk level score that is indicative of a risk to the information technology infrastructure that is associated with continuing to operate the component at the determined incompatible software level; and prioritize the correction of the determined incompatible software level by comparing the normalized environment risk level scores to other normalized environment risk level scores of other incompatible software levels determined within the information technology infrastructure.

20. The computer program product of claim 19, wherein the computer readable program code instructions for execution by the computer processing unit further cause the computer processing unit to:
   select each of the outage count scores, the average outage severity scores and the environment risk scores from a group comprising a lowest risk value, and a highest risk value that is higher than the lowest risk value; and
   combine the outage count score with the average outage severity score to generate the normalized historical affinity risk by:
   in response to determining that the average outage severity score is not the highest risk value, adding the outage count score to the average outage severity score to generate an additive result, dividing the additive result by two to generate an averaged result, and normalizing the averaged result; and
   in response to determining that the average outage severity score is the highest risk value, normalizing the highest risk value.

* * * * *